US012170469B2

(12) United States Patent
Moros et al.

(10) Patent No.: US 12,170,469 B2
(45) Date of Patent: Dec. 17, 2024

(54) ELECTRIC DRIVE AND METHOD OF OPERATING THE ELECTRIC DRIVE

(71) Applicant: MOLABO GmbH, Ottobrunn (DE)

(72) Inventors: Oleg Moros, Ismaning (DE); Florian Bachheibl, Munich (DE); Adrian Patzak, Aying (DE); Benjamin Rubey, Munich (DE)

(73) Assignee: MOLABO GMBH, Ottobrunn (DE)

( * ) Notice: Subject to any disclaimer, the term of this patent is extended or adjusted under 35 U.S.C. 154(b) by 452 days.

(21) Appl. No.: 17/427,064

(22) PCT Filed: Jan. 24, 2020

(86) PCT No.: PCT/EP2020/051802
§ 371 (c)(1),
(2) Date: Jul. 29, 2021

(87) PCT Pub. No.: WO2020/156957
PCT Pub. Date: Aug. 6, 2020

(65) Prior Publication Data
US 2022/0123638 A1    Apr. 21, 2022

(30) Foreign Application Priority Data
Jan. 30, 2019    (DE) .......................... 102019102351.3

(51) Int. Cl.
*B60L 58/18*    (2019.01)
*B60L 53/24*    (2019.01)
(Continued)

(52) U.S. Cl.
CPC ............... *H02K 19/34* (2013.01); *H02K 3/12* (2013.01); *H02K 3/28* (2013.01); *H02K 3/50* (2013.01); *H02K 2213/12* (2013.01)

(58) Field of Classification Search
CPC ............ H02K 3/12; H02K 19/34; H02K 3/50; H02K 3/28; H02K 2213/12; B60L 58/18;
(Continued)

(56) References Cited

U.S. PATENT DOCUMENTS

2011/0241591 A1 * 10/2011 Meynrd ................. H02K 19/34
363/71
2011/0315461 A1 * 12/2011 Suzuki .................... B60L 50/16
903/952

(Continued)

FOREIGN PATENT DOCUMENTS

CA    2690699 A1 *  7/2010 ............... H02K 3/12
CN    104283340 A     1/2015
(Continued)

OTHER PUBLICATIONS

First Examination Report for the Indian Patent Application No. 202127033534, mailed on Apr. 27, 2022, 5 pages.
(Continued)

*Primary Examiner* — Gabriel Agared
(74) *Attorney, Agent, or Firm* — Morgan, Lewis & Bockius LLP

(57) ABSTRACT

An electric drive (20) comprising an electric machine (10) is specified. The electric machine (10) comprises a stator (21) and a rotor (22) mounted so as to be movable with respect to the stator (21), wherein the stator (21) comprises at least two first conductor sections (23) and at least two second conductor sections (24), the stator (21) comprises at least one first short-circuiting means (25) and at least one second short-circuiting means (26), the first conductor sections (23) are electrically connected to the first short-circuiting means (25), the second conductor sections (24) are electrically connected to the second short-circuiting means (26), and the first conductor sections (23) and the second conductor sections (24) are each designed to be supplied with a (Continued)

separate electric phase. Moreover, a supply system (46) for the electric drive (20) and a method of operating the electric drive (20) are specified.

14 Claims, 12 Drawing Sheets

(51) Int. Cl.
*H02K 3/12* (2006.01)
*H02K 3/28* (2006.01)
*H02K 3/50* (2006.01)
*H02K 19/34* (2006.01)

(58) Field of Classification Search
CPC .. B60L 53/24; B60L 2220/54; B60L 2220/58; B60L 2220/56; Y02T 10/7072; Y02T 10/70; Y02T 90/14; Y02T 10/64
USPC .......................................................... 318/148
See application file for complete search history.

(56) References Cited

U.S. PATENT DOCUMENTS

| | | |
|---|---|---|
| 2012/0007552 A1 | 1/2012 | Song et al. |
| 2013/0076190 A1 | 3/2013 | Järvinen et al. |
| 2016/0028284 A1* | 1/2016 | Dajaku .................... H02K 3/12 310/54 |
| 2016/0173019 A1 | 6/2016 | Dajaku et al. |
| 2019/0245473 A1* | 8/2019 | Patzak .................... H02P 27/00 |
| 2019/0363599 A1 | 11/2019 | Hoang et al. |
| 2020/0185994 A1* | 6/2020 | Dajaku .................... H02K 17/14 |

FOREIGN PATENT DOCUMENTS

| | | |
|---|---|---|
| CN | 105305667 A | 2/2016 |
| CN | 105703686 A | 6/2016 |
| CN | 106233583 A | 12/2016 |
| DE | 102005032965 A1 | 3/2007 |
| DE | 102010061845 A1 | 1/2012 |
| DE | 102017116145 B3 | 11/2018 |
| WO | WO-2018149996 A1 | 8/2018 |
| WO | 2019016203 A1 | 1/2019 |

OTHER PUBLICATIONS

International Preliminary Report issued in International Application No. PCT/EP2020/051802, mailed on Aug. 12, 2021, 16 pages.
International Search Report and Written Opinion for International Application No. PCT/EP2020/051802, mailed on Apr. 17, 2020, 18 pages.
Annex to the Communication About Intention to Grant a European Patent for the European Patent Application 20702110.6 mailed on May 24, 2024, 57 Pages.
Office Action issued in Chinese Patent Application No. 202080011360.5, May 6, 2024, 23 pages including translation.

* cited by examiner

ELECTRIC DRIVE AND METHOD OF OPERATING THE ELECTRIC DRIVE

The present application relates to an electric drive, a supply system for the electric drive and a method of operating the electric drive.

The electric drive may comprise an electric machine comprising a stator and a rotor mounted so as to be movable with respect thereto. Electric machines may be operated as a motor or as a generator. The stator may comprise an electrical winding in slots formed of an electrically conductive material and having, for example, the shape of rods. The electrical winding is connected to a power supply unit, which may be multiphase.

In case of a high number of electrical phases of the stator, the manufacturing cost of the stator is substantially increased. To manufacture the stator it is necessary to position the electrically conductive rods accurately in the slots of the stator. The more electrical phases the stator has, the more time-consuming it is to position the rods accurately in the slots.

One object to be achieved is to provide an electric drive that can be manufactured efficiently. Another object to be achieved is to provide a supply system for the electric drive, which can be operated efficiently. Another object to be achieved is to provide an efficient method of operating the electric drive.

The objects are achieved by the subject matters of the independent patent claims. Advantageous embodiments and further developments are indicated in the subclaims.

According to at least one embodiment of the electric drive, the electric drive comprises an electric machine. The electric machine comprises a stator and a rotor mounted so as to be movable with respect to the stator. The rotor may be formed, for example, by a squirrel-cage rotor, a rotor with permanent magnets, an externally excited synchronous rotor, a rotor for a switched reluctance machine, a rotor for a synchronous reluctance motor or a combination of the foregoing. The rotor may be an internal rotor or an external rotor. An air gap may be disposed between the stator and the rotor. The stator may have the shape of a hollow cylinder.

The electric drive may be arranged in a vehicle or an aircraft. The vehicle may be a land vehicle, a water vehicle or an aircraft.

The stator comprises at least two first conductor sections and at least two second conductor sections. The first and second conductor sections may comprise an electrically conductive material such as copper or aluminum. The stator may include slots, each of which includes a conductor section. The stator may comprise one or more laminated stator cores in which the slots are formed. Preferably, the stator has a plurality of slots.

A core of the stator may comprise a magnetic material such as iron, steel, or soft magnetic composites. The first and second conductor sections may be electrically conductive rods, for example. The first and second conductor sections may be parallel to one another. The first and second conductor sections may extend in a straight line through the stator. Moreover, the first and second conductor sections may be equally spaced apart from one another.

The number of first conductor sections may be equal to the number of second conductor sections. This means that the stator may have as many first conductor sections as second conductor sections. Alternatively, it is possible that the number of first conductor sections is larger than or less than the number of second conductor sections. The first and second conductor sections may be arranged uniformly or symmetrically along the circumference of the stator. Alternatively, it is possible that the first and second conductor sections are arranged unevenly or asymmetrically along the circumference of the stator.

The first and second conductor sections may be arranged in a cylindrical shape along the circumference of the stator. Thus, the first and second conductor sections may extend from a first side of the stator to a second side of the stator. The first and second conductor sections may form a cage. In this case, the electric machine may be a radial flux machine.

Furthermore, it is possible that the first and second conductor sections are arranged in a star configuration. This can mean that the first and second conductor sections extend radially from a center of the stator to the outside of the stator. In this case, the electric machine may be an axial flux machine. This means that the stator may comprise soft magnetic composites instead of laminated stator cores.

The stator further comprises at least one first short-circuiting means and at least one second short-circuiting means. The first and second short-circuiting means may comprise an electrically conductive material. For example, the first short-circuiting means and/or the second short-circuiting means is a short-circuiting ring. The first and second short-circuiting means may be disposed at a first side of the stator. The first short-circuiting means and the second short-circuiting means may be in direct contact. Furthermore, it is possible that the first short-circuiting means and the second short-circuiting means are spaced apart from one another. In this case, the first short-circuiting means and the second short-circuiting means are not in direct contact with one another. The first short-circuiting means and the second short-circuiting means may each have the shape of a circle. Alternatively, the first short-circuiting means and the second short-circuiting means may each have the shape of a ring segment.

The first conductor sections are electrically connected to the first short-circuiting means. The first conductor sections may be connected to the first short-circuiting means such that they form a short circuit. The first conductor sections may be electrically connected to the first short-circuiting means at the first side of the stator electrically. Furthermore, it is possible that the first conductor sections are mechanically connected to the first short-circuiting means.

The second conductor sections are electrically connected to the second short-circuiting means. The second conductor sections may be connected to the second short-circuiting means such that they form a short circuit. The second conductor sections may be electrically connected to the second short-circuiting means at the first side of the stator. Furthermore, it is possible that the second conductor sections are mechanically connected to the second short-circuiting means.

Furthermore, it is possible that the first short-circuiting means is arranged at the first side of the stator and the second short-circuiting means is arranged at the second side of the stator or vice versa. This means that the first short-circuiting means and the second short-circuiting means may be arranged at the same side of the stator or at different sides of the stator.

The first conductor sections and the second conductor sections are each designed to be supplied with a separate electrical phase. This can mean that the first conductor sections and the second conductor sections can each be driven separately. This means that each of the first conductor sections and each of the second conductor sections can be driven separately. Aside from the first short-circuiting means, the first conductor sections may be electrically isolated from one another. Apart from the second short-circuiting means, the second conductor sections may be electrically isolated from one another. The first conductor sections may be electrically insulated from the second conductor sections. The first conductor sections and the second conductor sections may be designed to be supplied with a separate phase current. This means that each of the first conductor sections and each of the second conductor sections may be designed to be supplied with a separate phase current. The different phase currents may be provided by power electronics.

The first conductor sections and the second conductor sections may each be connected to a separate half-bridge, which is designed to supply each of the conductor sections with a separate phase current. For this purpose, the first conductor sections and the second conductor sections may each be connected to a power supply unit via their separate half-bridge. The phase currents may be out of phase relative to one another. Alternatively, only some of the phase currents are out of phase relative to one another and some of the phase currents are not out of phase relative to one another. This can mean that the phase currents are divided into groups, the phase currents of one group being in phase and the phase currents of different groups being out of phase relative to one another. In addition, the phase currents may have different amplitudes. The first conductor sections and the second conductor sections may each be connected to a separate half-bridge at a second side of the stator, which is arranged at a side of the stator facing away from the first side. By supplying the first and second conductor sections each with its separate phase current, they can generate one or more rotating fields during the operation of the electric drive. The rotating field or the rotating fields may be designed to drive a rotor of the electric machine. The first conductor sections and the second conductor sections may thus form an electrical winding of the stator. The power electronics may comprise the half-bridges.

Since the first conductor sections and the second conductor sections can each be driven separately, it is possible to adjust, during operation of the electric drive, which conductor sections will be supplied with a phase current. This means that it can be adjusted whether all of the first conductor sections and all of the second conductor sections are driven during operation or whether some of the first conductor sections and/or second conductor sections are not supplied with a phase current. Furthermore, it is possible not to drive all of the first conductor sections and/or all of the second conductor sections during operation of the electric drive. This means that the number of conductor sections used during operation can be adjusted. This allows for an efficient operation of the electric drive in different operating states.

The electrically conductive rods, which can form the first and second conductor sections, can advantageously be inserted in slots in the stator in an accurately fitting manner. Thus, a high slot fill factor can be achieved. In addition, no end windings are required at the sides of the stator. As a result, less overall installation space is required for the stator.

Since the stator comprises at least one first short-circuiting means and at least one second short-circuiting means, altogether fewer conductor sections are connected to each one of the short-circuiting means. This means that if the total number of conductor sections in the stator remains the same, the number of conductor sections connected to the first short-circuiting means, for example, is half the total number of conductor sections in the stator. If the stator has more than one first short-circuiting means and/or more than one second short-circuiting means, the number of conductor sections per short-circuiting means can be further reduced. A small number of conductor sections connected to a short-circuiting means is advantageous in the manufacture of the stator.

In the manufacture of the stator, the electrically conductive conductor sections are inserted into the slots of the stator, so that the conductor sections are each electrically insulated from the surrounding material of the stator. Thereby, the conductor sections are either inserted individually into the slots of the stator or several conductor sections are mechanically connected via a short-circuiting means. The greater the number of conductor sections simultaneously inserted into the stator, the more complex and error-prone is the manufacturing process. For example, an electrical insulation of the conductor sections against the surrounding material of the stator may be damaged. In addition, a larger force is required for a larger number of conductor sections which are simultaneously introduced into a stator. By using at least one first short-circuiting means and at least one second short-circuiting means, the number of conductor sections per short-circuiting means may be reduced. This means that in order to simplify the manufacturing process the stator comprises multiple components that can be joined together more easily in the manufacturing process.

When the conductor sections are inserted into the slots individually, they are subsequently connected via one or more short-circuiting means.

The first conductor sections may be mechanically connected to the first short-circuiting means prior to being inserted in the stator. The second conductor sections may be mechanically connected to the second short-circuiting means prior to being inserted in the stator. The first short-circuiting means with the first conductor sections and the second short-circuiting means with the second conductor sections can each be inserted in the stator more easily and safely than a short-circuiting means to which all conductor sections are connected. Thus, the electric drive can be manufactured more efficiently altogether.

Furthermore, the electric drive described herein advantageously has more degrees of freedom in terms of its design and thus may be designed to various requirements in a more flexible way.

According to at least one embodiment of the electric drive, the stator comprises at least three first conductor sections and at least three second conductor sections. Thus, the stator can generate a rotating field.

According to at least one embodiment of the electric drive, the first conductor sections and the second conductor sections are each connected to a separate half-bridge. The half-bridges may be connected to a battery and may be arranged to provide a respective separate phase current. The half-bridges may be, for example, bipolar electronic switches, such as metal oxide semiconductor field-effect transistors (MOSFET) or bipolar transistors (IGBT). Each half-bridge is allocated to a first conductor section or a second conductor section, such that each half-bridge is electrically connected to a first conductor section or a second conductor section. The half-bridges may be arranged to supply the respective connected conductor section with a separate phase current. The battery may be a DC voltage source. Furthermore, the battery voltage may be 60 V at most. In this case, the half-bridges can have two switches which are alternately opened and closed so that an AC voltage is applied to the conductor sections connected to the half-bridges. By applying an AC voltage to the conductor sections, the stator can generate a rotating field.

According to at least one embodiment of the electric drive, an electrically insulating material is arranged between the first short-circuiting means and the second short-circuiting means. The electrically insulating material may be arranged entirely between the first short-circuiting means and the second short-circuiting means. Thus, the first short-circuiting means and the second short-circuiting means may be electrically insulated from one another. The electrically insulating material is, for example, an electrically insulating layer or air.

Furthermore, it is possible that the surface of the first short-circuiting means and the second short-circuiting means is chemically treated so that the electrically conductive regions of the first short-circuiting means and the second short-circuiting means are electrically insulated from one another.

Advantageously, an isolation of the first and second short-circuiting means from one another allows for external components to be connected to the first and second short-circuiting means.

According to at least one embodiment of the electric drive, the first conductor sections and the second conductor sections are arranged alternately along the circumference of the stator. This can mean that a first conductor section is arranged adjacent to two second conductor sections, respectively. A first conductor section can be arranged between two second conductor sections along the circumference of the stator, respectively. This means that the first conductor sections and the second conductor sections are arranged alternately along the circumference of the stator. Each of the first conductor sections can be arranged adjacent to two second conductor sections. Thus, each of the first conductor sections may be disposed between two second conductor sections along the circumference of the stator. In this regard, the stator may have just as many first conductor sections as second conductor sections. A symmetrical design of the stator simplifies the manufacture of the electric drive.

According to at least one embodiment of the electric drive, the first short-circuiting means and the second short-circuiting means are arranged side by side along an axis of rotation of the rotor. The axis of rotation of the rotor can be parallel to a main direction of extension of the stator. The fact that the first short-circuiting means and the second short-circuiting means are arranged side by side along an axis of rotation of the rotor can mean that the first short-circuiting means and the second short-circuiting means are disposed at different positions along an axis which runs in parallel to the axis of rotation of the rotor. The first short-circuiting means and the second short-circuiting means can be arranged one above the other along an axis which runs in parallel to the axis of rotation of the rotor. In this case, the first short-circuiting means and the second short-circuiting means may both have the shape of a circle. Moreover, the first short-circuiting means or the second short-circuiting means may have recesses through which the first or the second conductor sections extend. Thus, in this arrangement of the first and second short-circuiting means, the first conductor sections are connected to the first short-circuiting means and the second conductor sections are connected to the second short-circuiting means. By using at least one first short-circuiting means and at least one second short-circuiting means, the electric drive can be manufactured in a simplified manner.

According to at least one embodiment of the electric drive, the first short-circuiting means and the second short-circuiting means are arranged side by side in a cross-section through the electric machine. The cross-section through the electric machine may extend in a plane which is perpendicular to the axis of rotation of the rotor. The first short-circuiting means and the second short-circuiting means may both have the shape of a circle segment. As seen in a cross-sectional view through the electric machine, the circle segments may be arranged along a circle. Each of the circle segments is connected to a smaller number of conductor sections than a short-circuiting means which has the shape of a whole circle. Thus, the manufacture of the electric drive is simplified.

According to at least one embodiment of the electric drive, the first short-circuiting means and the second short-circuiting means are arranged side by side along an axis of rotation of the rotor, and another first short-circuiting means and another second short-circuiting means are arranged side by side in a cross-section through the electric machine.

According to at least one embodiment of the electric drive, the number of first conductor sections is equal to the number of second conductor sections. Thus, the first conductor sections and the second conductor sections may be symmetrically distributed along the circumference of the stator. Advantageously, the stator can generate a symmetrical rotating field.

According to at least one embodiment of the electric drive, the number of first conductor sections is different from the number of second conductor sections. For example, the number of first conductor sections may be a multiple or a fraction of the number of second conductor sections.

According to at least one embodiment of the electric drive, the first short-circuiting means and the second short-circuiting means each form an electric star point. This means that the sum of the phase currents of the first conductor sections connected to the first short-circuiting means is 0. Likewise, the sum of the phase currents of the second conductor sections connected to the second short-circuiting means is 0. Furthermore, at the electrical star point, the sum of the phase voltages of the connected conductor sections is 0. This means that the sum of the phase voltages of the first conductor sections connected to the first short-circuiting means is 0. In addition, the sum of the phase voltages of the second conductor sections connected to the second short-circuiting means is 0. The fact that the first short-circuiting means and the second short-circuiting means each form an electrical star point further means that no circuit currents flow in the first short-circuiting means and in the second short-circuiting means during operation of the electric drive.

Nevertheless, a current may flow in the first short-circuiting means and in the second short-circuiting means during operation of the electric drive. This current $I_K$ in the first or second short-circuiting means results from the phase currents $I_P$ of the conductor sections connected to the respective short-circuiting means, the number of pole pairs p and the number N of connected conductor sections as follows:

$$I_K = \frac{I_P}{2 \sin\left(\frac{\pi p}{N}\right)}$$

This means, the lower the number of conductor sections connected to a short-circuiting means, the lower is the current which flows in the respective short-circuiting means during operation of the electric drive. It is therefore advantageous that the stator comprises at least one first short-circuiting means and at least one second short-circuiting means, so that the number of conductor sections connected to a short-circuiting means is reduced in contrast to a stator with only one short-circuiting means.

According to at least one embodiment of the electric drive, the first short-circuiting means and the second short-circuiting means each comprise an electrical terminal for external contacting. This means that a cable or a terminal, which is not part of the electric drive, can be connected to the electrical terminal of the first short-circuiting means and to the electrical terminal of the second short-circuiting means, respectively. For example, the electrical terminals of the first short-circuiting means and the second short-circuiting means may be designed to be connected to an external charging device in an electrically conductive manner. This can mean that the external charging device has two electrical contacts, one of which is electrically connected to the first short-circuiting means and the other of which is electrically connected to the second short-circuiting means. The charging device may be provided for charging a battery connected to the electric drive. Since the stator comprises at least one first short-circuiting means and at least one second short-circuiting means, the charging device may be connected to the electric drive via the electrical terminals. Thus, advantageously, the battery connected to the electric drive can be charged efficiently.

According to at least one embodiment of the electric drive, the first conductor sections and the second conductor sections each comprise at least one electrically conductive rod, wherein the rods are arranged in slots of the stator. This allows for a high slot fill factor.

According to at least one embodiment of the electric drive, the stator is designed to generate at least one rotating field in which the number of pole pairs is variable. This means that the phase currents provided by the half-bridges can be changed in such a way that the rotating field generated by the stator may have different numbers of pole pairs. The number of poles of the rotating field generated by the stator depends on the phase currents provided by the half-bridges. Thus, by changing the phase currents, the number of poles of the rotating field generated by the stator can be changed. The rotating field can be time-variable. In order for the first short-circuiting means and the second short-circuiting means to form an electrical star point each, the sum of the respective phase currents or phase voltages must add up to 0 for each selected number of pole pairs. Advantageously, the number of pole pairs of the rotating field generated by the stator can be changed in the electric machine without changing the design of the electric machine. Thus, it is also possible to change the number of pole pairs during operation of the electric machine. Alternatively or additionally, the stator can be designed to generate a plurality of rotating fields in which the pole pair numbers cannot be changed.

According to at least one embodiment of the electric drive, the first conductor sections are connected to a first power supply unit and the second conductor sections are connected to a second power supply unit. The first power supply unit and the second power supply unit may each be a power supply unit, a battery, a portion of a battery, a capacitor, a fuel cell or a combination of at least two of these.

According to at least one embodiment of the electric drive, the first power supply unit and the second power supply unit are electrically connected to one another. The first power supply unit and the second power supply unit may be electrically connected in series. Alternatively, the first power supply unit and the second power supply unit may be electrically connected in parallel. By using at least one first power supply unit and at least one second power supply unit, they may be configured to be smaller than a joint power supply unit for supplying all conductor sections. Therefore, the first power supply unit and the second power supply unit may be distributed more flexibly in a vehicle comprising the electric drive.

According to at least one embodiment of the electric drive, the first conductor sections and the second conductor sections are connected to a joint power supply unit.

Furthermore, a supply system for the electric drive is specified. According to at least one embodiment of the supply system for the electric drive, the supply system comprises the electric drive described herein. Thus, all features of the described electric drive are also disclosed for the supply system and vice versa. Furthermore, the supply system comprises a transformer which is connected to a power source. The transformer is designed to convert an input voltage applied to the transformer to an output voltage. The input voltage and the output voltage are AC voltages. The input voltage may be higher than the output voltage. The input voltage may be a voltage provided by the power source. The transformer may include a first electrical contact at the output side and a second electrical contact at the output side. The output voltage may be tapped between the first contact at the output side and the second contact at the output side.

The supply system further comprises a detachable electrical connection between the transformer and the first short-circuiting means. This can mean that the first or the second contact at the output side of the transformer is connected to the first short-circuiting means in an electrically conductive manner, wherein the connection can be reversibly detached.

The supply system further comprises a detachable electrical connection between the transformer and the second short-circuiting means. This can mean that that one of the first and second contacts of the transformer at the output side which is not connected to the first short-circuiting means is connected to the second short-circuiting means in an electrically conductive manner, wherein the connection can be reversibly detached.

The supply system further comprises a battery. The battery may be designed to supply power to the electric drive. For example, the battery voltage is 60 V at most.

The electric drive is arranged between the transformer and the battery. Thus, the AC voltage provided by the transformer at the first and second contacts at the output side can be converted to a DC voltage by the electric drive. This means that the electric drive can be used as a rectifier. For this purpose, the transformer is connected to the first short-circuiting means and to the second short-circuiting means. Then the AC voltage applied to the first and second conductor sections can be rectified via the half-bridges. The half-bridges are electrically connected to the battery so that the battery can be supplied with the DC voltage generated.

The supply system may comprise a charging device comprising the transformer. The electric drive and the battery may be located in a vehicle or an aircraft. The vehicle may be a land vehicle or a watercraft. In this case, the charging device is not part of the vehicle or aircraft. The charging device may be an external charging device for charging the battery.

Advantageously, the external charging device may be connected directly to the electric drive. For charging a battery of a vehicle or an aircraft, an external charging device may be connected to the vehicle or the aircraft. In this case, it is not necessary for the charging device to include a rectifier, since the AC voltage provided by the transformer is rectified via the electric drive.

Furthermore, a method of operating the electric drive is specified. Thus, all features of the described electric drive are also disclosed for the method of operating the electric drive and vice versa.

The electric drive can be used to rectify an AC voltage for charging a battery. The battery can be charged via the electric drive. For this purpose, it is necessary to apply a voltage between the half-bridges. This results in applying a voltage between the first short-circuiting means and the second short-circuiting means. If the applied voltage is an AC voltage, it can be rectified via the half-bridges. For this purpose, the half-bridges can be operated in a similar manner compared to the situation in which the battery supplies power to the electric drive. This can mean that two switches of each half-bridge are alternately opened and closed so that the AC voltage applied to the conductor sections is rectified. The battery can be charged with the DC voltage generated. The first conductor sections are connected in parallel while the battery is charging. In addition, the second conductor sections are connected in parallel while the battery is charging. For example, the battery voltage is 60 V at most.

Advantageously, thus no rectifier is required in an external charging device for charging the battery. By using the electric drive to charge the battery, the battery can be charged efficiently.

According to at least one embodiment of the method, an AC voltage is supplied to the electric drive by an energy source, the AC voltage is rectified by the electric drive, and the battery is supplied with a DC voltage provided by the electric drive. The energy source is an AC voltage source. A transformer may be arranged between the energy source and the electric drive. This means that the AC voltage provided by the energy source is transformed by the transformer. The AC voltage from the energy source is supplied to the electric drive. This can mean that the electric drive is electrically connected to the energy source. For example, the electric drive is electrically connected to the energy source via the transformer. The rectification of the AC voltage is performed as described for the supply system for the electric drive.

If the stator of the electric machine comprises a total of at least four short-circuiting means, at least two transformers can be connected to the electric drive. This means that at least two transformers can be connected in parallel to the electric drive. Consequently, the power to be transmitted per transformer can be smaller. Alternatively, a larger total power may be transmitted.

Furthermore, a further method of operating the electric drive is specified. Thus, all features of the described electric drive are also disclosed for the further method of operating the electric drive and vice versa.

According to at least one embodiment of the method, a DC voltage is supplied to the electric drive by a battery, the DC voltage is converted to an AC voltage by the electric drive, and an electric load is supplied with the AC voltage provided by the electric drive.

The electric drive may thus be used to provide power to an electric load. The electric load may be any type of consumer that requires electrical power. For example, the electric load is a power grid. To supply power to the electric load, the electric drive is used as an inverter in the reverse direction as compared to the previous method. This can mean that two switches of each half-bridge are alternately opened and closed, so that the DC voltage provided by the battery is converted to an AC voltage. For this purpose, the first conductor sections are connected in parallel and the second conductor sections are connected in parallel. The electric load may be connected to the first short-circuiting means and to the second short-circuiting means, between which an AC voltage can be tapped. Furthermore, it is possible that the electric load is connected to the electric drive via a transformer. Overall, in this method, the electric drive and the battery are used as a generator, for example, to feed electricity into a power grid.

According to at least one further embodiment of the method of operating the electric drive, the first conductor sections are supplied with phase currents from the battery via the connected half-bridges, so that at least one rotating field is generated. This induces alternating currents in the second conductor sections, which are rectified via the half-bridges connected to the second conductor sections and fed to the battery. This embodiment is particularly advantageous if the battery has multiple battery modules to enable balancing. In this case, the battery may also be a capacitor, a fuel cell or a combination thereof. In this embodiment, alternatively the second conductor sections may be used to generate the rotating field and the first conductor sections may be used for rectification. In addition, embodiments with third and further conductor sections are possible.

Below, the electric drive described herein, the supply system and the methods for operating the electric drive will be illustrated in more detail in connection with embodiments and the accompanying Figures.

Figure 16:
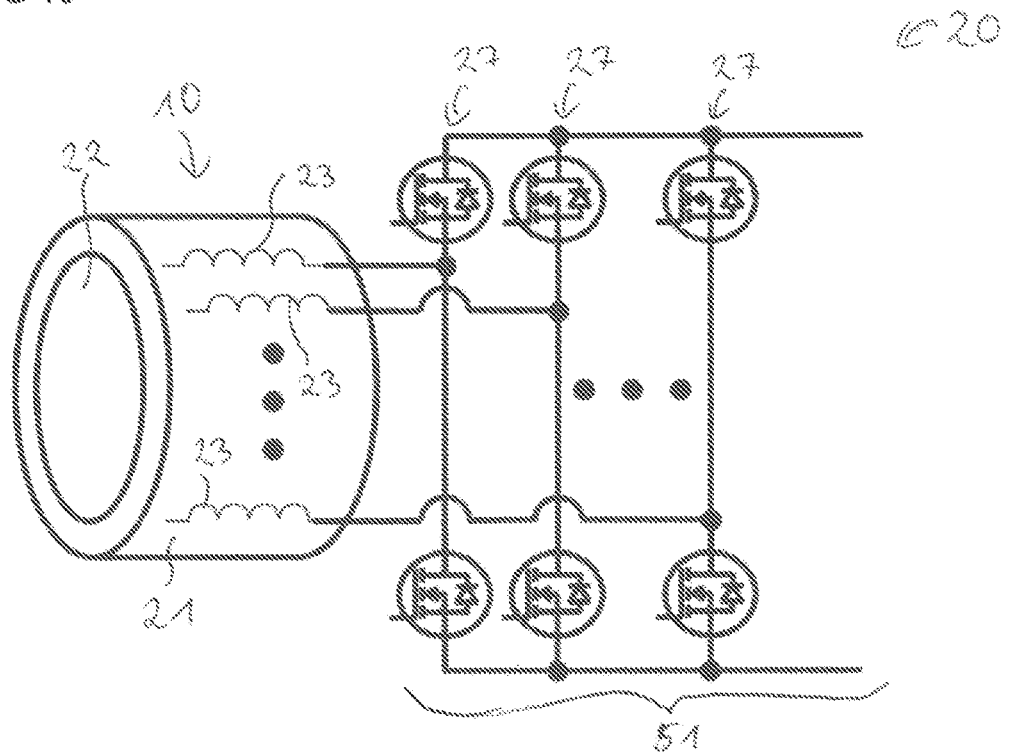

In FIG. 16 schematically shows an embodiment of the electric drive.

Figure 17:
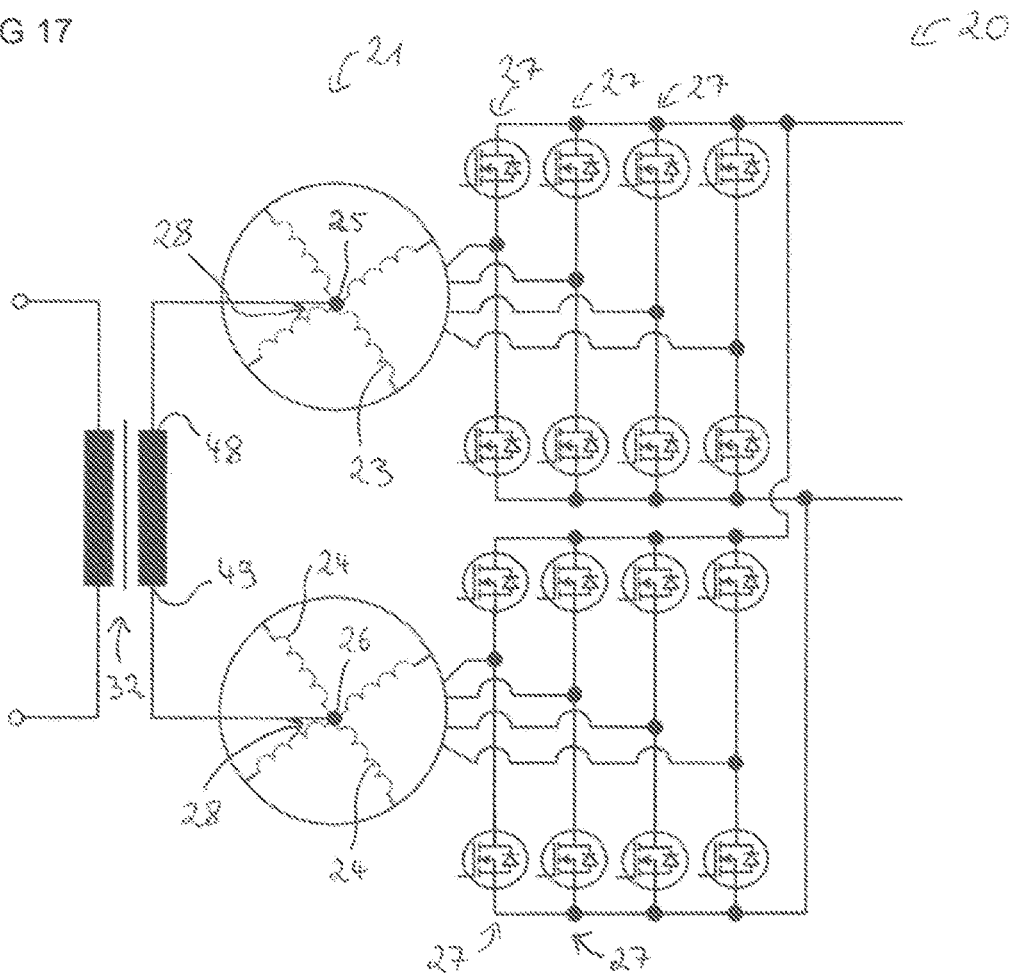

FIG. 17 shows an equivalent circuit diagram of the electric drive according to another embodiment with a transformer.

Figure 18:
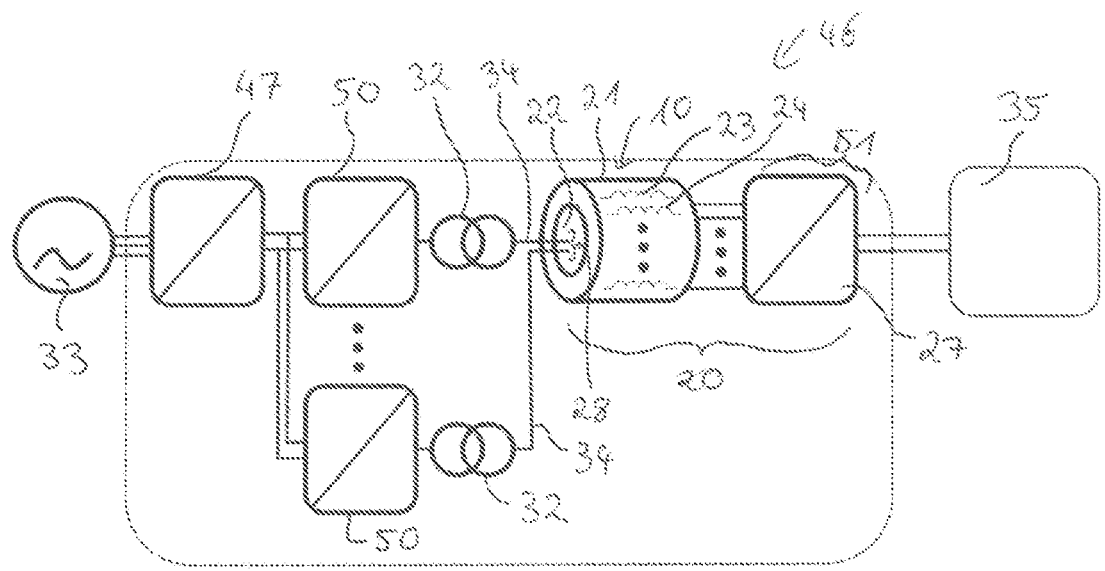

FIG. 18 shows a supply system for the electric drive according to an embodiment.

Figure 19A:
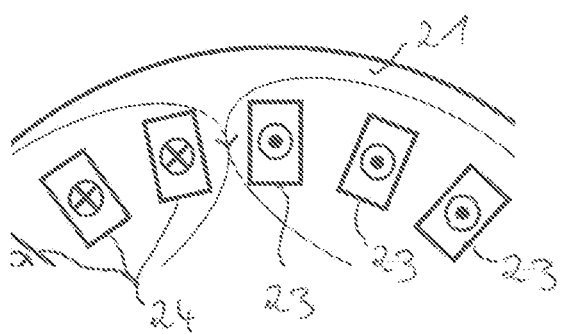
Figure 19B:
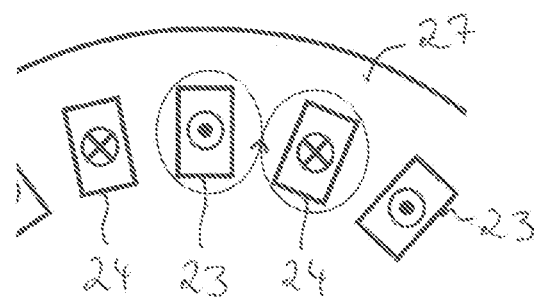

FIGS. 19A and 19B each show a section through a cross-section of a stator according to another embodiment.

Figure 1A:
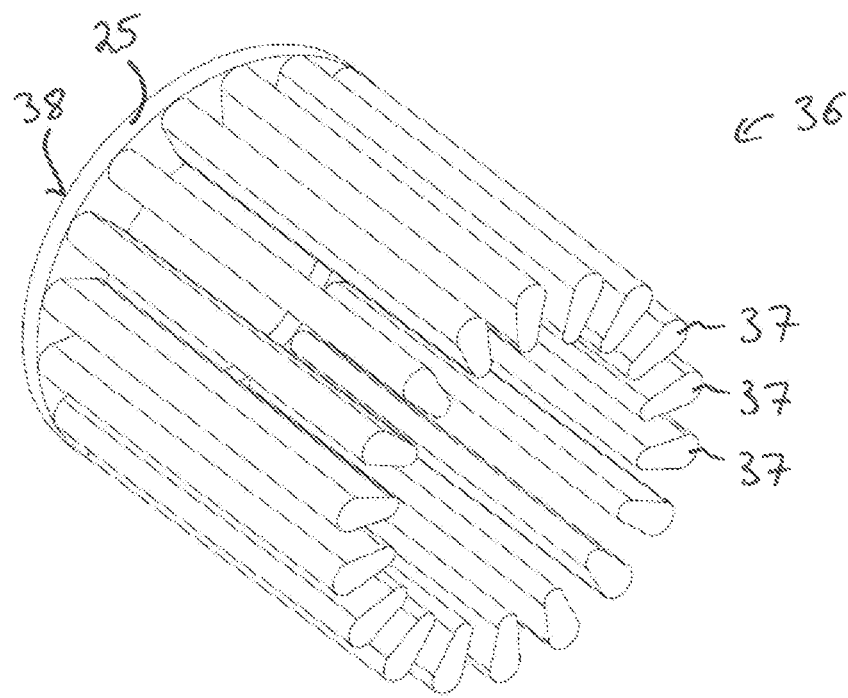
FIGS. 1A and 1B show an example of an electrical winding and a stator.

FIG. 1A shows an example of an electrical winding 36. The electrical winding 36 comprises a plurality of electrically conductive rods 37. The rods 37 are arranged in a cylindrical shape. The rods 37 extend in a straight line and in parallel to one another. At a first side 38 of the electrical winding 36, the rods 37 are each electrically connected to a first short-circuiting means 25. The first short-circuiting means 25 is a short-circuiting ring.

Figure 1B:
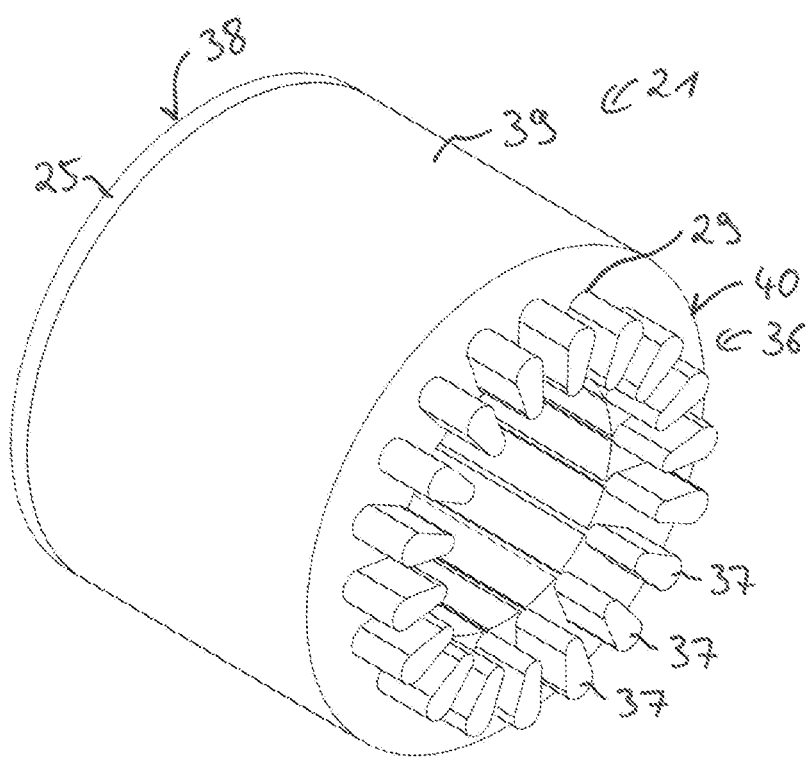

FIG. 1B shows an example of a stator 21. The example is no embodiment. The stator 21 comprises the electrical winding 36 shown in FIG. 1A. Furthermore, the stator 21 comprises a plurality of slots 29. Each of the rods 37 of the electrical winding 36 is disposed in a respective slot 29. The slots 29 extend through a laminated stator core 39 from a first side 38 of the stator 21 to a second side 40. At the first side 38, the first short-circuiting means 25 is arranged. The stator 21 may be used in a radial flux machine. The radial flux machine may comprise a rotor 22 arranged in the stator 21.

Figure 2A:
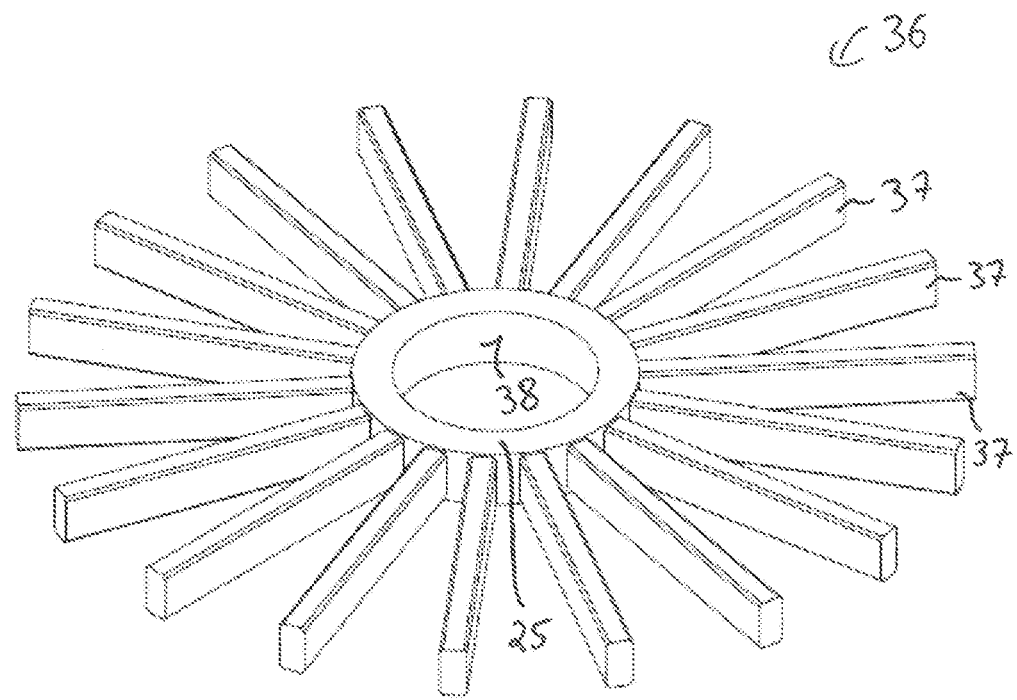
FIGS. 2A and 2B show another example of an electrical winding and a stator.

FIG. 2A shows a further example of an electrical winding 36. The electrical winding 36 comprises a plurality of electrically conductive rods 37. The rods 37 extend radially or in a star-shaped manner outwardly from a center of a circle. At a first side 38 of the rods 37, the rods 37 are electrically connected to one another by a first short-circuiting means 25. The first side 38 is the side facing the center of the circle. The first short-circuiting means 25 is a short-circuit ring.

Figure 2B:
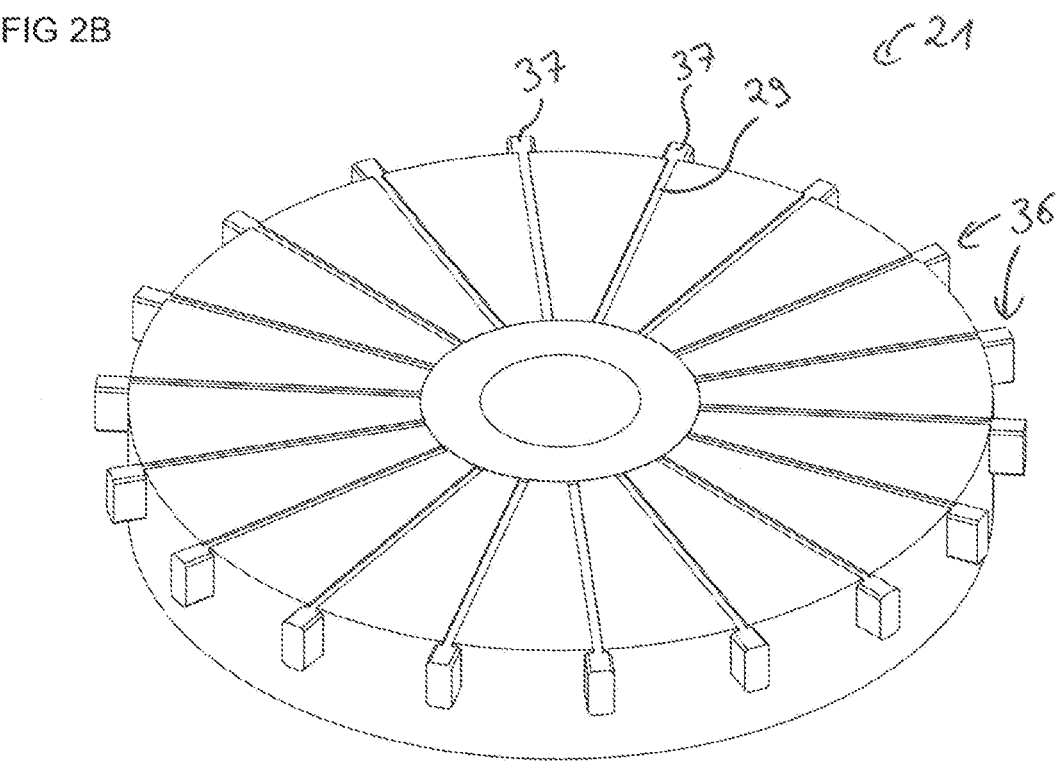

FIG. 2B shows a stator 21 comprising the electrical winding 36 shown in FIG. 2A. The stator 21 is not an embodiment. The stator 21 has slots 29, in each of which one of the rods 37 is arranged. The slots 29 may be surrounded by soft magnetic composites. The stator 21 may be used in an axial flux machine.

Figure 3A:
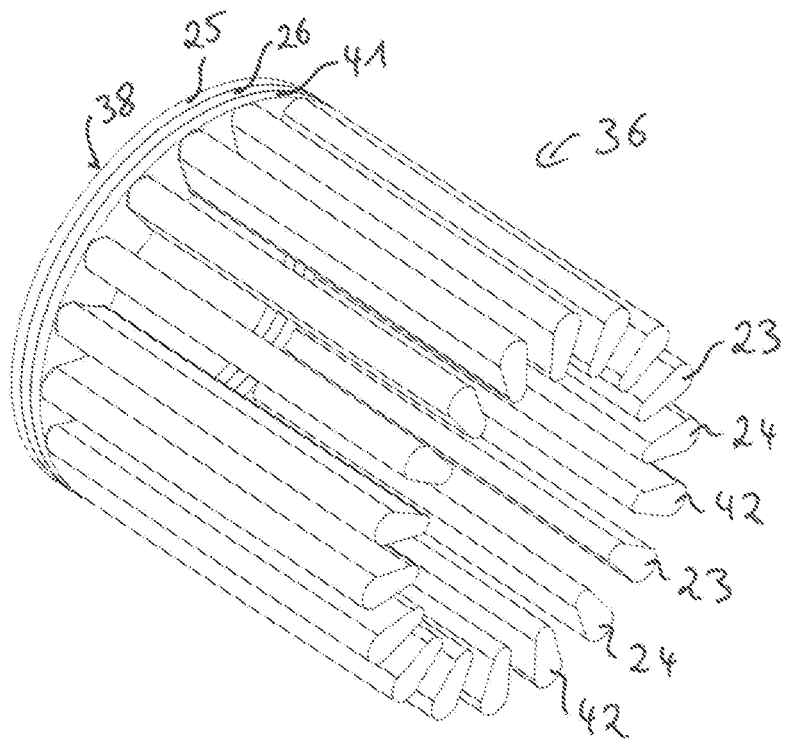
FIGS. 3A and 3B show an electrical winding of a stator according to one embodiment.

FIG. 3A shows an electrical winding 36 of an electric machine 10 of the electric drive 20 according to an embodiment. The electrical winding 36 comprises a plurality of first conductor sections 23, second conductor sections 24 and third conductor sections 42. The first conductor sections 23, the second conductor sections 24 and the third conductor sections 42 may be disposed in slots 29 of a stator 21 of the electric machine 10. The electric machine 10 further comprises a rotor 22 rotatably mounted with respect to the stator 21, which rotor 22 is arranged in the stator 21. The first conductor sections 23, the second conductor sections 24 and the third conductor sections 42 are electrically conductive rods 37 as shown in FIG. 1A. A first short-circuiting means 25, a second short-circuiting means 26 and a third short-circuiting means 41 are arranged at a first side 38 of the electrical winding 36. The first short-circuiting means 25, the second short-circuiting means 26 and the third short-circuiting means 41 each comprise an electrically conductive material. Furthermore, the first short-circuiting means 25, the second short-circuiting means 26 and the third short-circuiting means 41 each have the shape of a ring. The first conductor sections 23 are electrically connected to the first short-circuiting means 25. The second conductor sections 24 are electrically connected to the second short-circuiting means 26. The third conductor sections 42 are electrically connected to the third short-circuiting means 41. The first short-circuiting means 25, the second short-circuiting means 26 and the third short-circuiting means 41 are arranged adjacent to one another along the main direction of extension of the first conductor sections 23. In this regard, the first short-circuiting means 25 and the second short-circuiting means 26 may be in direct contact with one another. Similarly, the second short-circuiting means 26 and the third short-circuiting means 41 may be in direct contact with one another. Alternatively, the first short-circuiting means 25, the second short-circuiting means 26 and the third short-circuiting means 41 may be electrically insulated from one another. For this purpose, for example, an electrically insulating material may be arranged between the first short-circuiting means 25, the second short-circuiting means 26 and the third short-circuiting means 41.

Figure 3B:
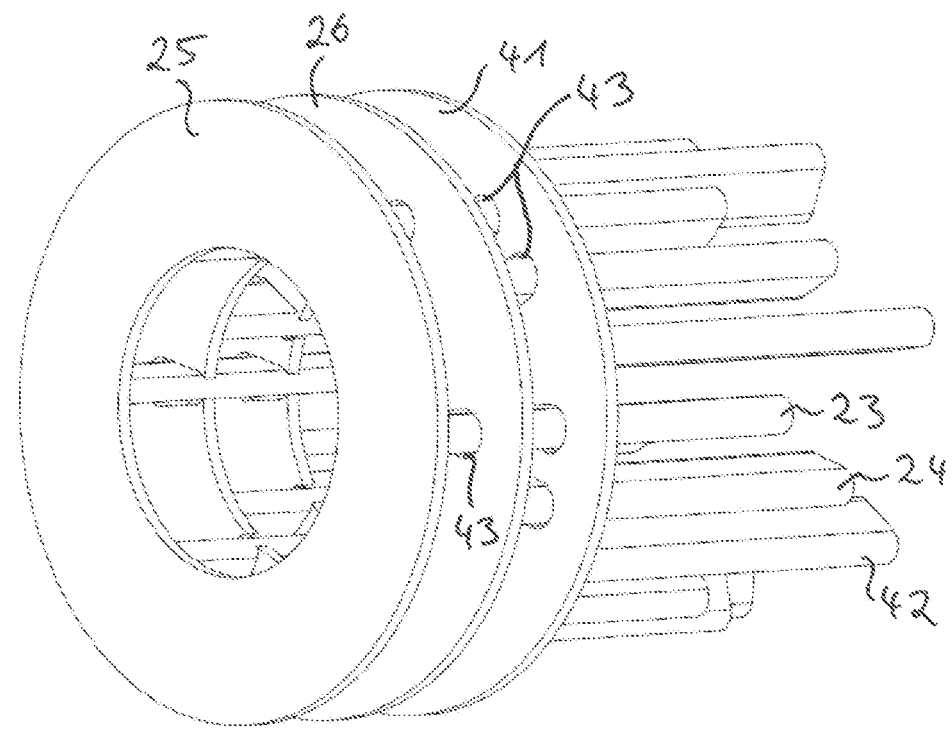

FIG. 3B shows the electrical winding 36 shown in FIG. 3A. Individual components of the electrical winding 36 are shown offset from one another. The third short-circuiting means 41 has recesses 43 through which the first conductor sections 23 and the second conductor sections 24 extend. Thus, only the third conductor sections 42 are electrically connected to the third short-circuiting means 41. The second short-circuiting means 26 has recesses 43 through which the first conductor sections 23 extend. Thus, only the second conductor sections 24 are electrically connected to the second short-circuiting means 26. The first conductor sections 23 are electrically connected to the first short-circuiting means 25. The first conductor sections 23, the second conductor sections 24 and the third conductor sections 42 are arranged alternately along the circumference of the stator 21. This means that the first conductor sections 23, the second conductor sections 24 and the third conductor sections 42 are arranged alternately along the circumference of the first short-circuiting means 25. Each of the first conductor sections 23 is arranged between a second conductor section 24 and a third conductor section 42. Each of the second conductor sections 24 is disposed between a first conductor section 23 and a third conductor section 42. Each of the third conductor sections 42 is disposed between a first conductor section 23 and a second conductor section 24. The number of first conductor sections 23 is equal to the number of second conductor sections 24 and equal to the number of third conductor sections 42. The electrical winding 36 is arranged in slots 29 of the stator 21 according to an embodiment of the electric machine 10.

Figure 4:
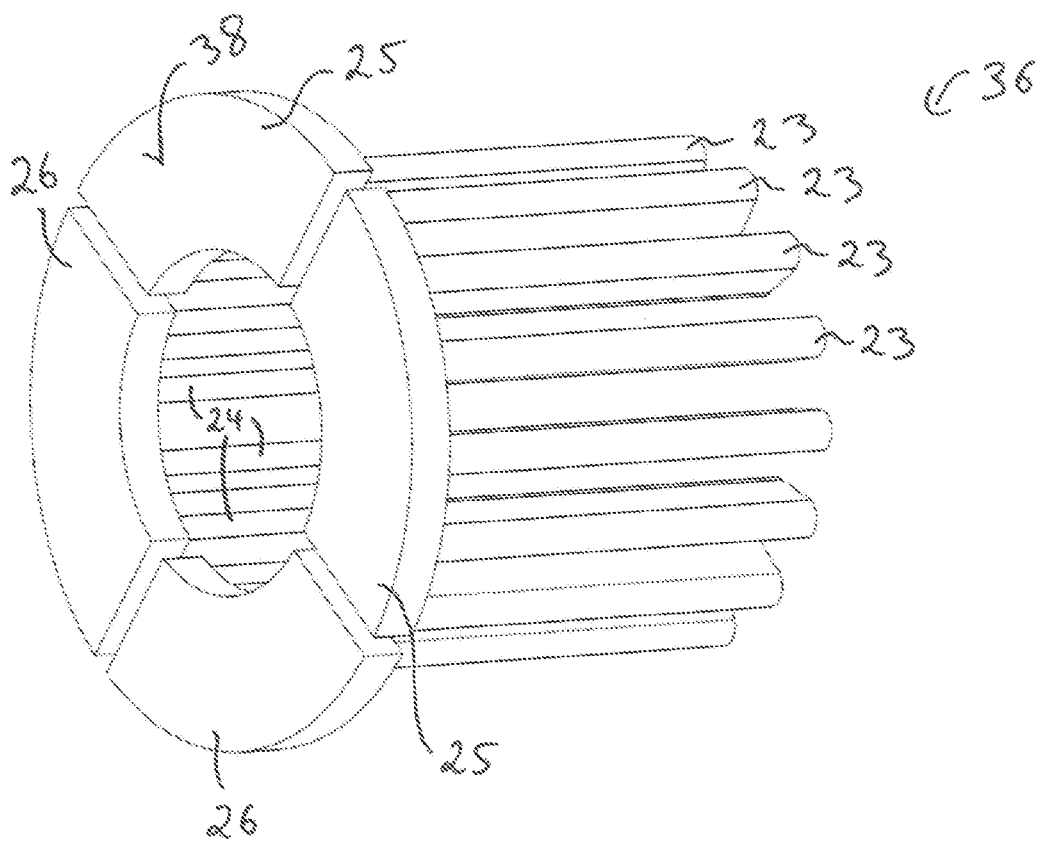
FIG. 4 shows an electrical winding of a stator according to another embodiment.

FIG. 4 shows the electrical winding 36 of the electric machine 10 according to another embodiment. Compared to the embodiment shown in FIG. 3A, the electrical winding 36 comprises a total of four short-circuiting means 25, 26. This means that the electrical winding 36 comprises two first short-circuiting means 25 and two second short-circuiting means 26. The first short-circuiting means 25 and the second short-circuiting means 26 are arranged at a first side 38 of the electrical winding 36. The first short-circuiting means 25 and the second short-circuiting means 26 each have the shape of a segment of a circle. The first short-circuiting means 25 and the second short-circuiting means 26 are arranged to be spaced apart from one another and are not in direct contact. The first conductor sections 23 and the second conductor sections 24 are not arranged alternately along the circumference of the stator 21. The first conductor sections 23, which are connected to the first short-circuiting means 25, are arranged side by side along the circumference of the stator 21. In a cross-section through the electric machine 10, the first short-circuiting means 25 and the second short-circuiting means 26 are arranged side by side. This means that the first short-circuiting means 25 and the second short-circuiting means 26 are arranged side by side in a plane.

Figure 5:
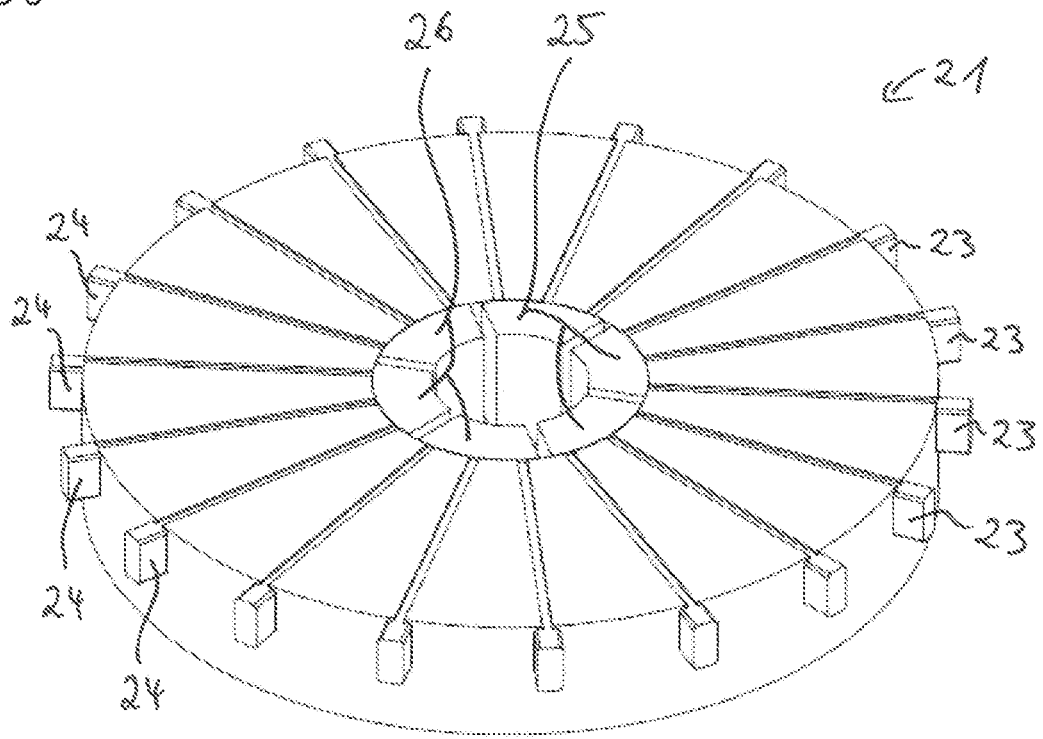
FIG. 5 shows an embodiment of a stator.

FIG. 5 shows an embodiment of the stator 21. The stator 21 has the design shown in FIG. 2B, the difference being that the stator 21 comprises a total of six short-circuiting means 25, 26. For this purpose, the first short-circuiting means 25 shown in FIG. 2B is divided into six segments. Each of the short-circuiting means 25, 26 is connected to three conductor sections 23, 24. The short-circuiting means 25, 26 are arranged to be spaced apart and are not in direct contact.

Figure 6A:
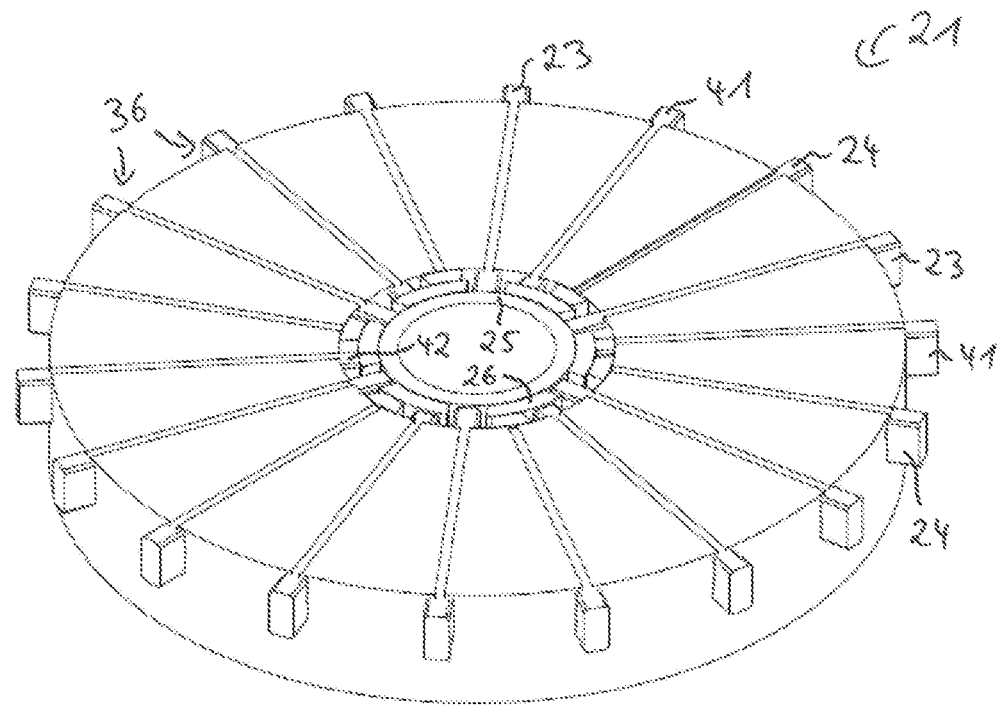
FIGS. 6A and 6B show a stator according to another embodiment and the electrical winding of the stator.

FIG. 6A shows another embodiment of the stator 21. Compared to the embodiment shown in FIG. 5, the stator 21 comprises a first short-circuiting means 25, a second short-circuiting means 26 and a third short-circuiting means 41. The short-circuiting means 25, 26, 41 are arranged offset to one another. This means that the short-circuiting means 25, 26, 41 are arranged at different radial positions in cross-section through the stator 21. The electrical winding 36 of the stator 21 comprises six first conductor sections 23, which are connected to a first short-circuiting means 25. The first conductor sections 23 are evenly distributed along the circumference of the stator 21, so that they are not arranged directly adjacent to one another. Six second conductor sections 24 are connected to the second short-circuiting means 26, and six third conductor sections 42 are connected to the third short-circuiting means 41. The second conductor sections 24 and the third conductor sections 42 are each distributed just like the first conductor sections 23 along the circumference of the stator 21. The short-circuiting means 25, 26, 41 may be in direct contact with one another. Furthermore, it is possible that an electrically insulating material is arranged between the short-circuiting means 25, 26, 41.

Figure 6B:
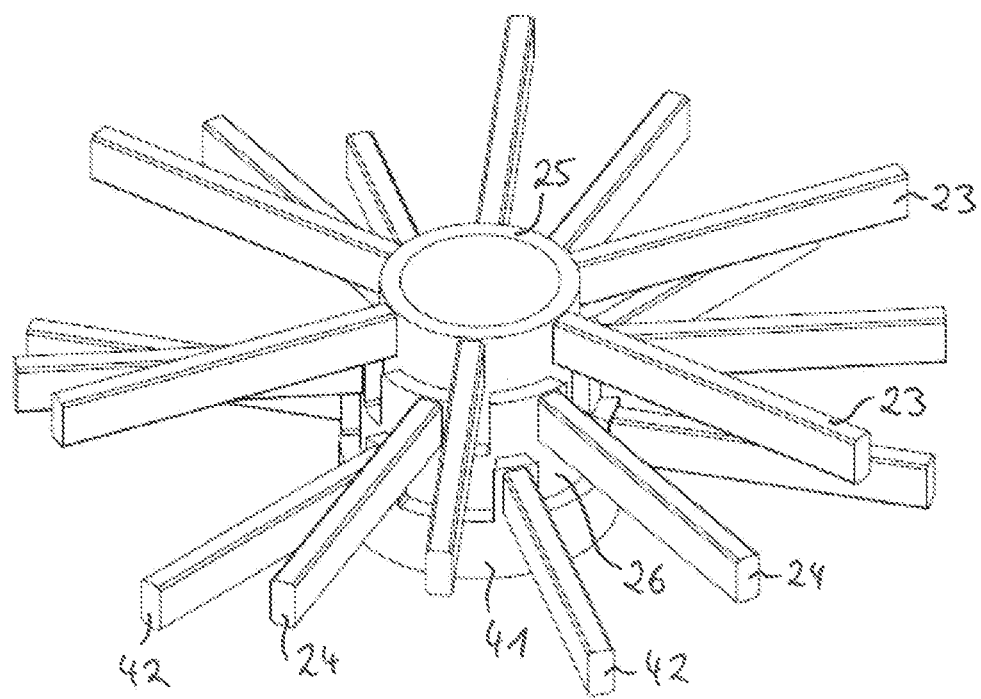

In FIG. 6B, the short-circuiting means 25, 26, 41 shown in FIG. 6A are shown with the conductor sections 23, 24, 42. The short-circuiting means 25, 26, 41 are shown offset from one another with the respective conductor sections 23, 24, 42. The second short-circuiting means 26 and the third short-circuiting means 41 each have recesses 43 in which the respective other conductor sections 23, 24 are arranged. In addition, the first short-circuiting means 25 has a smaller diameter than the second short-circuiting means 26. The second short-circuiting means 26 has a smaller diameter than the third short-circuiting means 41.

Figure 7:
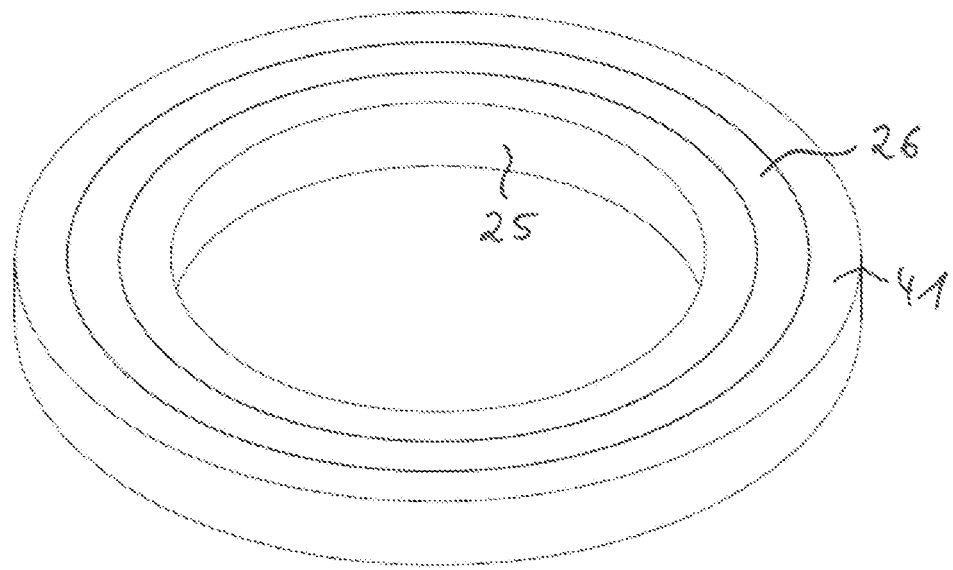
FIGS. 7 and 8 show short-circuiting means of a stator according to another embodiment.

FIG. 7 shows a first short-circuiting means 25, a second short-circuiting means 26 and a third short-circuiting means 41 of the stator 21 according to a further embodiment. The first short-circuiting means 25, the second short-circuiting means 26 and the third short-circuiting means 41 each have the shape of a ring. Moreover, the first short-circuiting means 25, the second short-circuiting means 26 and the third short-circuiting means 41 are arranged side by side in a cross-section through the electric machine 10. Thus, the first short-circuiting means 25 has a smaller diameter than the second short-circuiting means 26. The second short-circuiting means 26 has a smaller diameter than the third short-circuiting means 41. The first short-circuiting means 25, the second short-circuiting means 26 and the third short-circuiting means 41 may be in direct contact or an electrically insulating material may be arranged therebetween. This arrangement of the short-circuiting means 25, 26, 41 is independent of the arrangement of the conductor sections 23, 24, 42.

Figure 8:
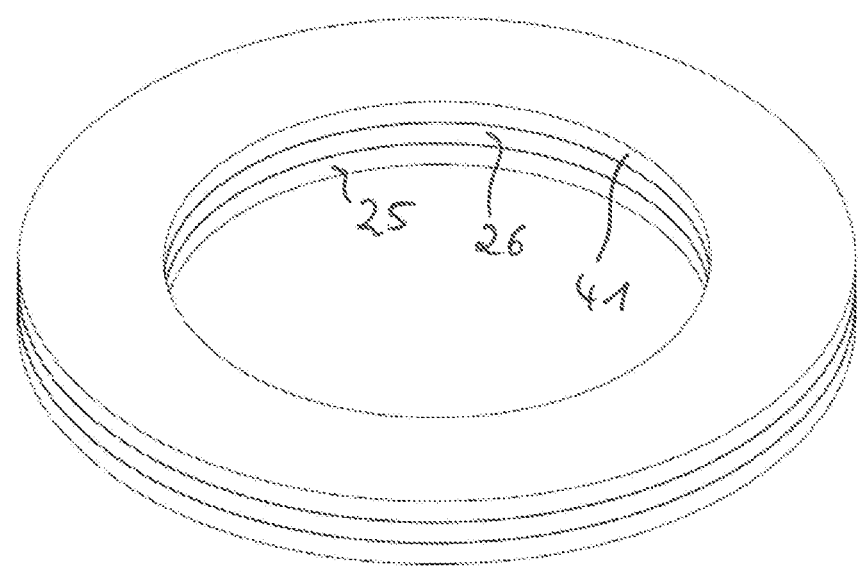

FIG. 8 shows a first short-circuiting means 25, a second short-circuiting means 26 and a third short-circuiting means 41 of the stator 21 according to another embodiment. The first short-circuiting means 25, the second short-circuiting means 26 and the third short-circuiting means 41 each have the shape of a ring. Moreover, the first short-circuiting means 25, the second short-circuiting means 26 and the third short-circuiting means 41 are arranged side by side along an axis of rotation of the rotor 22. This means that the first short-circuiting means 25, the second short-circuiting means 26 and the third short-circuiting means 41 each have the same diameter. The first short-circuiting means 25, the second short-circuiting means 26 and the third short-circuiting means 41 may be in direct contact or an electrically insulating material may be disposed therebetween. This arrangement of the short-circuiting means 25, 26, 41 is independent of the arrangement of the conductor sections 23, 24, 42.

According to another embodiment, the stator 21 comprises a combination of short-circuiting means 25, 26 shown in FIGS. 7 and 8.

Figure 9:
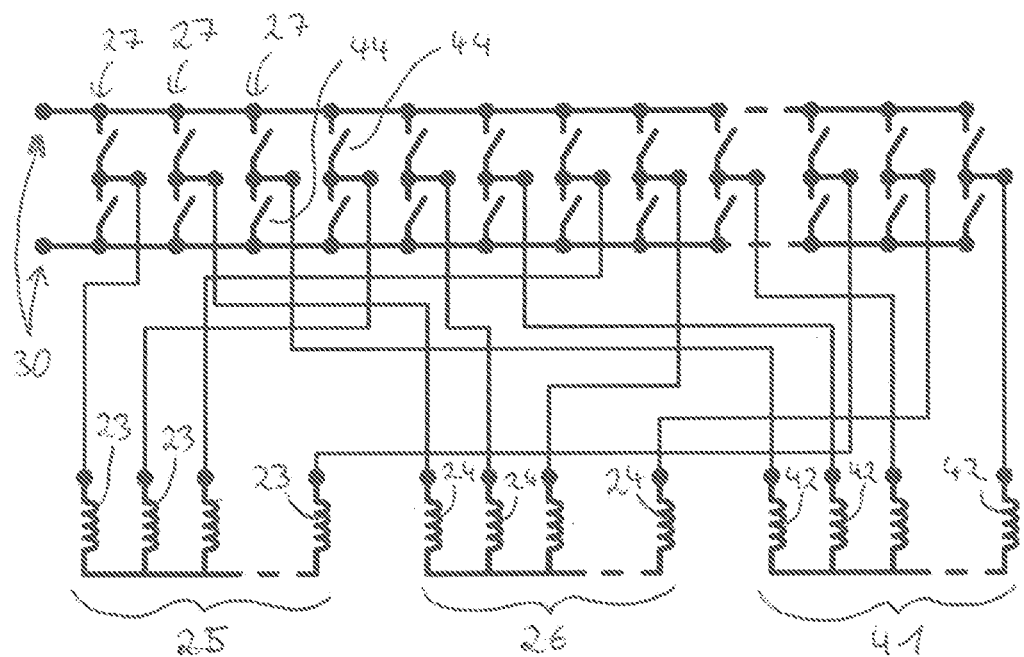
FIGS. 9, 10A, 10B, 11, 12, 13 and 14 show equivalent circuit diagrams of the electric drive according to various embodiments.

FIG. 9 shows an equivalent circuit diagram of the electric drive 20 according to an embodiment. The stator 21 comprises a first short-circuiting means 25, a second short-circuiting means 26 and a third short-circuiting means 41. First conductor sections 23 are electrically connected to the first short-circuiting means 25. Second conductor sections 24 are electrically connected to the second short-circuiting means 26. Third conductor sections 42 are electrically connected to the third short-circuiting means 41. The first conductor sections 23, the second conductor sections 24 and the third conductor sections 42 are each electrically connected to their separate half-bridge 27. The half-bridges 27 are each connected in parallel to a first power supply unit 30. The first power supply unit 30 is a DC voltage source. The half-bridges 27 each comprise two switches 44. The first conductor sections 23, the second conductor sections 24 and the third conductor sections 42 are arranged alternately along the circumference of the stator 21.

Figure 10A:
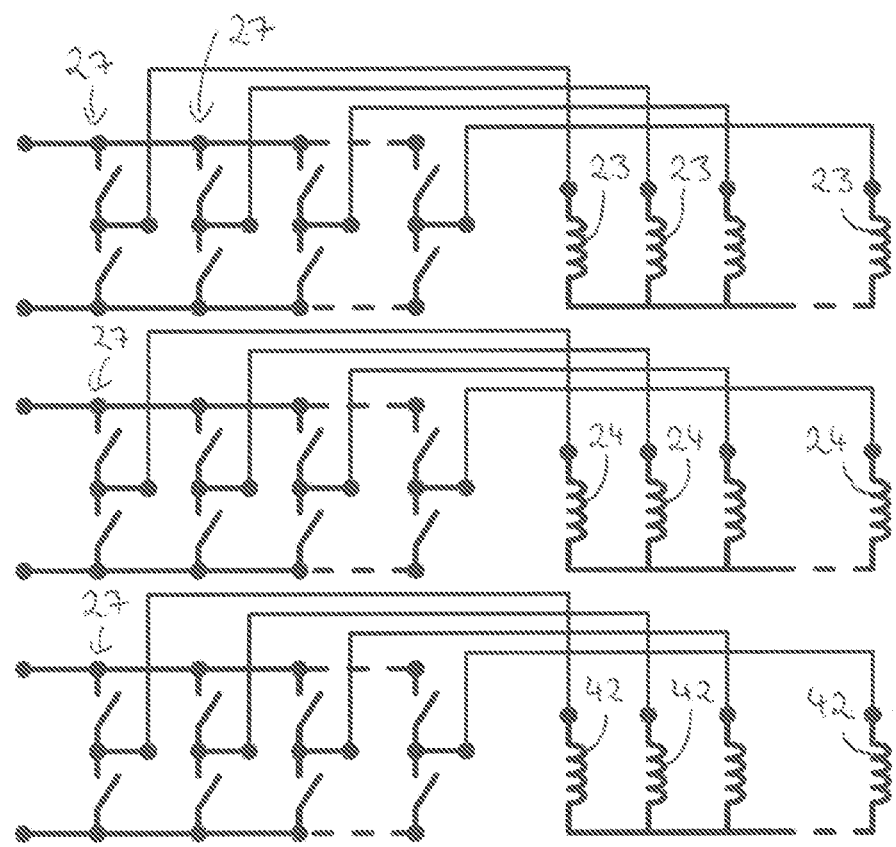

FIG. 10A shows an equivalent circuit diagram of the electric drive 20 according to another embodiment. In contrast to the embodiment shown in FIG. 9, the half-bridges 27 allocated to the first conductor sections 23 are connected in parallel to one another. In addition, the half-bridges 27 allocated to the second conductor sections 24 are connected in parallel to one another, and the half-bridges 27 allocated to the third conductor sections 42 are connected in parallel to one another. The half-bridges 27 may be electrically connected to the first power supply unit 30.

Figure 10B:
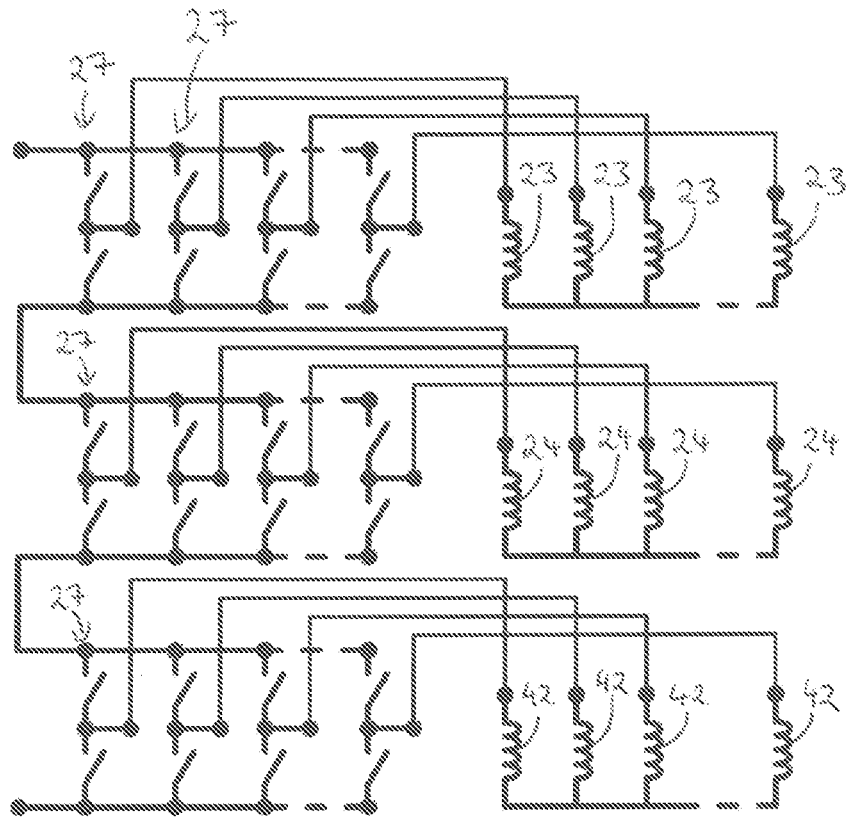

FIG. 10B shows an equivalent circuit diagram of the electric drive 20 according to another embodiment. In contrast to the embodiment shown in FIG. 10A, the half-bridges 27 allocated to the first conductor sections 23 are connected in series to the half-bridges 27 allocated to the second conductor sections 24 and to the half-bridges 27 allocated to the third conductor sections 42. The half-bridges 27 may be electrically connected to the first power supply unit 30 via such series connection.

Figure 11:
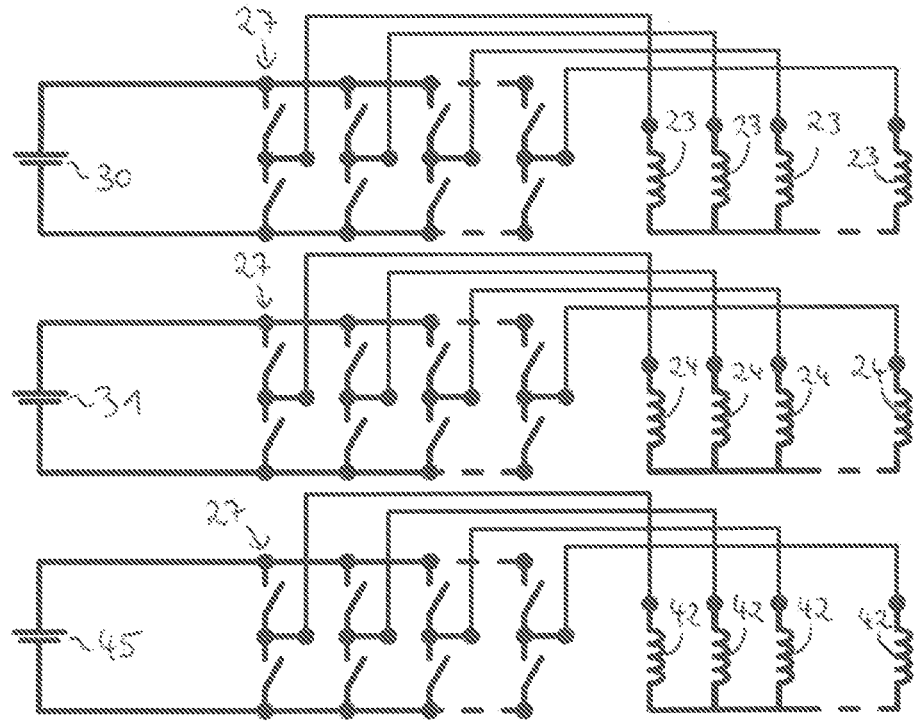

FIG. 11 shows an equivalent circuit diagram of the electric drive 20 according to another embodiment. In contrast to the embodiment shown in FIG. 9, the first conductor sections 23 are electrically connected to a first power supply unit 30 via the associated half-bridges 27. The second conductor sections 24 are electrically connected to a second power supply unit 31 via the associated half-bridges 27. The third conductor sections 42 are electrically connected to a third power supply unit 45 via the associated half-bridges 27. The first power supply unit 30, the second power supply unit 31 and the third power supply unit 45 may be separate batteries, capacitors or fuel cells. Alternatively, the first power supply unit 30, the second power supply unit 31 and the third power supply unit 45 may be individual sections or modules of a battery. Thus, if required, the different conductor sections 23, 24, 42 can be supplied with different voltages. This is advantageous in partial-load operation. The first conductor sections 23, the second conductor sections 24 and the third conductor sections 42 may be arranged alternately along the circumference of the stator 21 as shown in FIG. 3A or side by side as shown in FIG. 4.

Figure 12:
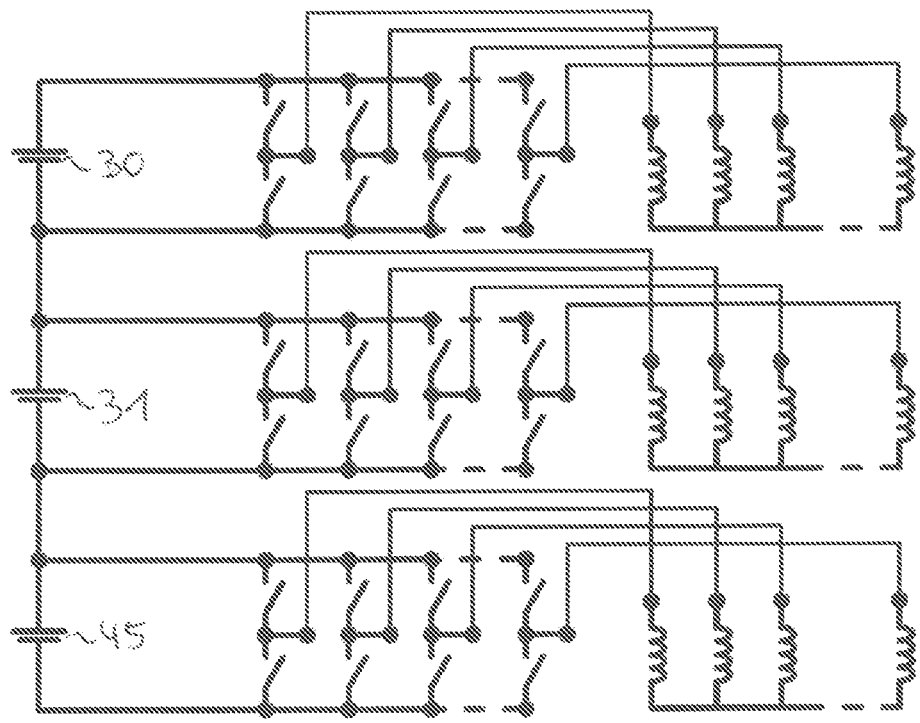

FIG. 12 shows an equivalent circuit diagram of the electric drive 20 according to another embodiment. In contrast to the embodiment shown in FIG. 11, the first power supply unit 30, the second power supply unit 31 and the third power supply unit 45 are connected in series with one another. By connecting the power supply units 30, 31, 45 in series, a higher total voltage can be achieved. This allows for the use of small voltages in the stator 21 and the connection to external systems that are operated at a larger voltage. For example, the external systems may be a charging device.

Figure 13:
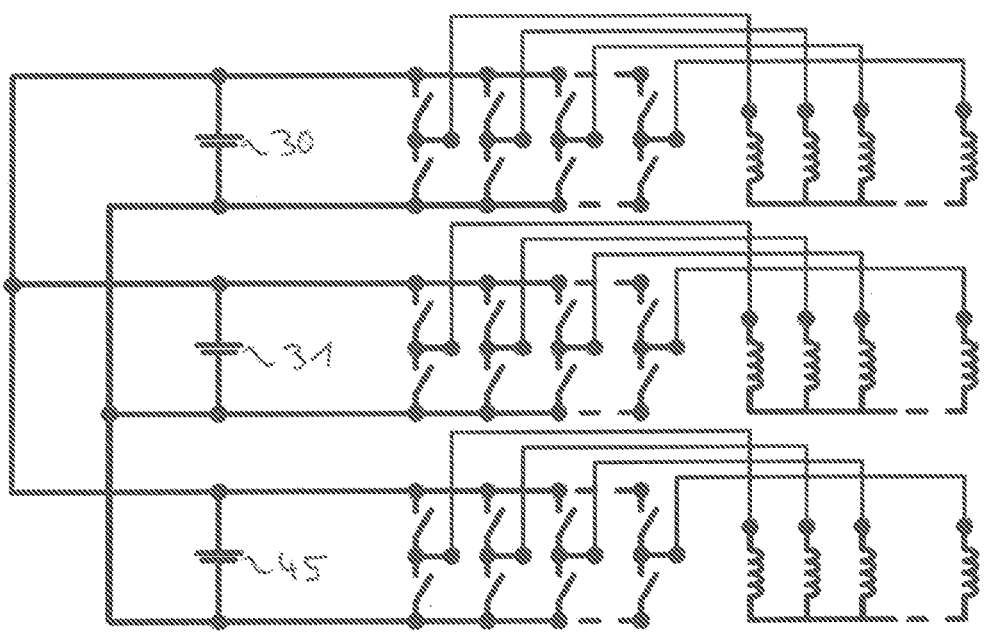

FIG. 13 shows an equivalent circuit diagram of the electric drive 20 according to another embodiment. In contrast to the embodiment shown in FIG. 11, the first power supply unit 30, the second power supply unit 31 and the third power supply unit 45 are connected in parallel.

Figure 14:
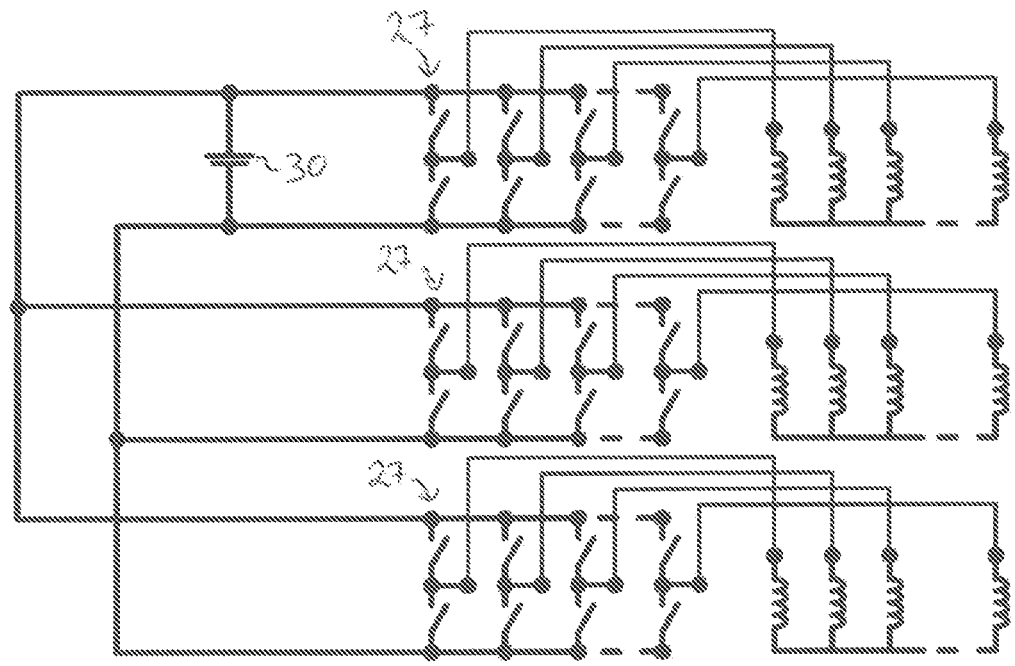

FIG. 14 shows an equivalent circuit diagram of the electric drive 20 according to another embodiment. In contrast to the embodiment shown in FIG. 13, the half-bridges 27 are connected in total to only one first power supply unit 30.

Alternatively, the embodiments shown in FIGS. 9, 10, 11, 12, 13 and 14 may each comprise only a first short-circuiting means 25 and a second short-circuiting means 26 and no third short-circuiting means 41.

Figure 15:
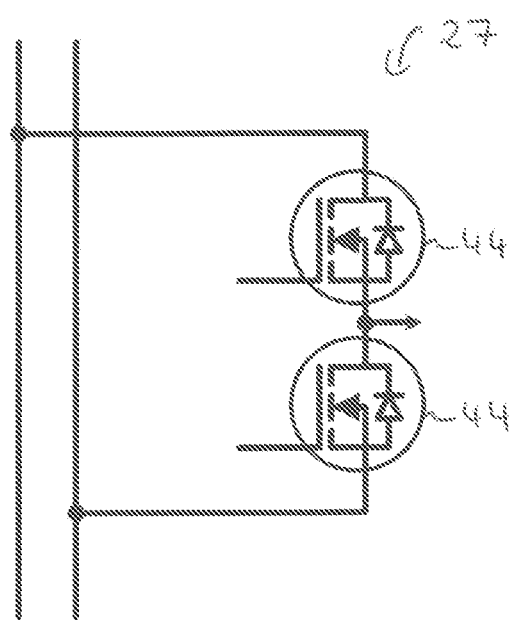
FIG. 15 shows an equivalent circuit diagram of a half-bridge.

FIG. 15 shows an equivalent circuit diagram of a half-bridge 27. The half-bridge 27 comprises two metal oxide semiconductor field-effect transistors (MOSFET) as switches 44.

FIG. 16 schematically shows an embodiment of the electric drive 20. The electric machine 10 comprises a stator 21 and a rotor 22 mounted so as to be movable with respect to the stator 21. The rotor 22 is arranged in the stator 21. The electric machine 10 is a radial flux machine. The stator 21 is designed to generate at least one rotating field in which the number of pole pairs is variable. Alternatively or additionally, the stator 21 may be configured to generate a plurality of rotating fields in which the number of pole pairs is not variable. The stator 21 comprises at least three first conductor sections 23. The second conductor sections 24 are not shown. The first conductor sections 23 are each designed to be supplied with a separate electrical phase. For this purpose, the first conductor sections 23 are each connected to a separate half-bridge 27. The half-bridges 27 form a power electronics 51 of the electric drive 20.

FIG. 17 shows an equivalent circuit diagram of the electric drive 20 according to another embodiment. The stator 21 comprises a first short-circuiting means 25 and a second short-circuiting means 26. First conductor sections 23 are electrically connected to the first short-circuiting means 25. Second conductor sections 24 are electrically connected to the second short-circuiting means 26. The first short-circuiting means 25 and the second short-circuiting means 26 each form an electrical star point. Furthermore, the first short-circuiting means 25 and the second short-circuiting means 26 are electrically insulated from one another. Each of the first conductor sections 23 and each of the second conductor sections 24 is connected to a separate half-bridge 27. The half-bridges 27 allocated to the first conductor sections 23 are connected in parallel to one another. The half-bridges 27 allocated to the second conductor sections 24 are also connected in parallel to one another. The arrangement of the first conductor sections 23 and the second conductor sections 24 along the circumference of the stator 21 is arbitrary. The first short-circuiting means 25 and the second short-circuiting means 26 each comprise an electrical terminal 28 for external contacting. The electrical terminals 28 are electrically connected to a transformer 32. The transformer 32 has a first contact 48 at the output side, which is electrically connected to the first short-circuiting means 25. Furthermore, the transformer 32 comprises a second contact 49 at the output side, which is electrically connected to the second short-circuiting means 26. The transformer 32 is not part of the electric drive 20.

For example, the transformer 32 is a component of an embodiment of a supply system 46 and is connected to a power source.

FIG. 18 schematically shows a supply system 46 for the electric drive 20 according to an embodiment. The supply system 46 comprises the electric drive 20 with the electric machine 10 and the power electronics 51. The electric machine 10 comprises the stator 21 with the rotor 22 and the half-bridges 27 connected to the first and second conductor sections 23, 24. The power supply system 46 further comprises a battery 35 electrically connected to the electric drive 20 via the half-bridges 27. The battery 35 may be the first power supply unit 30. The supply system 46 further comprises a transformer 32 which is connected to a power source 33. The power source 33 is an AC power source. Furthermore, the supply system 46 comprises a detachable electrical connection 34 between the transformer 32 and the first short-circuiting means 25 of the electric drive 20, and a detachable electrical connection 34 between the transformer 32 and the second short-circuiting means 26 of the electric drive 20. Thus, the electric drive 20 is disposed between the transformer 32 and the battery 35. The detachable electrical connections 34 between the transformer 32 and the electric drive 20 are designed to be electrically connected to the electrical terminals 28 of the first short-circuiting means 25 and the second short-circuiting means 26. The supply system 46 further comprises a first converter 47 and a second converter 50. The first converter 47 converts the AC voltage provided by the power source 33 to a DC voltage (AC/DC converter). The second converter 50 converts the DC voltage to an AC voltage for the transformer 32 (DC/AC converter). Overall, the supply system 46 may include a plurality of transformers 32, first converters 47 and second converters 50, which is represented by dots. In this case, each of the transformers 32 is connected to a first short-circuiting means 25 and to a second short-circuiting means 26 of the electric drive 20 via a detachable electrical connection 34. The transformers 32 are connected in parallel to one another. Since the electric drive 20 may have a plurality of first short-circuiting means 25 and a plurality of second short-circuiting means 26, advantageously, a plurality of transformers 32 may be connected to the electric drive 20. This allows a large amount of power to be transferred to the battery 35.

The electric drive 20 and the battery 35 may be arranged in a vehicle or an aircraft. The remaining components of the supply system 46 may be arranged outside the vehicle or aircraft, for example, in an external charging device.

FIG. 18 further shows that the electric drive 20 may be used to charge the battery 35. For this purpose, an AC voltage is supplied by the power source 33. The AC voltage is rectified by the electric drive 20. This is done by electrically connecting the transformer 32 to the first short-circuiting means 25 and the second short-circuiting means 26. Thus, the first conductor sections 23 and the second conductor sections 24 are supplied with the AC voltage. The AC voltage is rectified using the half-bridges 27. Then, the battery 35 connected to the half-bridges 27 is supplied with the DC voltage provided by the electric drive 20. Thus, the battery 35 can be efficiently charged.

FIG. 18 also shows that the electric drive 20 may be used to supply an AC voltage to an electric load 52. For this purpose, a DC voltage is supplied to the electric drive 20 by the battery 35. The DC voltage is converted to an AC voltage by the electric drive 20 using the half-bridges 27. Subsequently, the electric load 52 is supplied with the AC voltage provided. For this purpose, the electric load 52 may be directly connected to the first short-circuiting means 25 and the second short-circuiting means 26 or to the transformer 32. In this case, the power source 33 shown in FIG. 18 may be the electric load 52.

FIG. 19A shows a section through a cross-section of the stator 21 according to another embodiment. Here, three first conductor sections 23 are arranged directly adjacent to one another. Furthermore, three second conductor sections 24 are arranged directly adjacent to one another. The section through the cross-section through the stator 21 is shown for a situation where the electric drive 20 is used to charge the battery 35. In this case, the current for charging the battery 35 flows in the same direction in the first conductor sections 23. In the second conductor sections 24, the current flows in the opposite direction compared to the first conductor sections 23.

This results in stray fields which are indicated by a line around the first and second conductor sections 23, 24.

FIG. 19B shows a section through a cross-section through the stator 21 according to a further embodiment. The first conductor sections 23 and the second conductor sections 24 are arranged alternately along the circumference of the stator 21. This means that during the use of the electric drive 20 to charge the battery 35, the current of adjacent conductor sections 23, 24 flows in opposite directions. As a result, the stray fields are much smaller than in the embodiment shown in FIG. 19A. In the case of smaller stray fields, the efficiency of the transformer 32 is advantageously increased. Thus, all in all a greater power can be transmitted. This design of the stator 21 is not possible with distributed electrical windings, since the current therein flows in the same direction in adjacent conductors, as is shown in FIG. 19A.

LIST OF REFERENCE NUMERALS

10: electric machine
20: electric drive
21: stator
22: rotor
23: first conductor section
24: second conductor section
25: first short-circuiting means
26: second short-circuiting means
27: half bridge
28: electrical terminal
29: slot
30: first power supply unit
31: second power supply unit
32: transformer
33: power source
34: electrical connection
35: battery
36: electrical winding
37: rod
38: first side
39: laminated stator core
40: second side
41: third short-circuiting means
42: third conductor section
43: recess
44: switch
45: third power supply unit
46: supply system
47: first converter
48: first contact on the output side
49: second contact on the output side
50: second converter
51: power electronics
52: electric load

The invention claimed is:

1. An electric drive, comprising:
an electric machine, comprising:
a stator and a rotor mounted so as to be movable with respect to the stator,
wherein
the stator comprises at least two first conductor sections and at least two second conductor sections,
the stator comprises at least one first short-circuiting means and at least one second short-circuiting means,
the first conductor sections are electrically connected to the first short-circuiting means,
the second conductor sections are electrically connected to the second short-circuiting means, and
each of the first and second conductor sections is to be supplied with a separate electric phase, wherein each of the first and second conductor sections is connected to a separate half-bridge such that each separate half-bridge is connected to a respective one of the first conductor sections and the second conductor sections.

2. The electric drive according to claim 1, in which an electrically insulating material is arranged between the first short-circuiting means and the second short-circuiting means.

3. The electric drive according to claim 1, in which the first conductor sections and the second conductor sections are arranged alternately along a circumference of the stator.

4. The electric drive according to claim 1, wherein the first short-circuiting means and the second short-circuiting means are arranged side by side along an axis of rotation of the rotor.

5. The electric drive according to claim 1, in which the first short-circuiting means and the second short-circuiting means are arranged side by side in a cross-section through the electric machine.

6. The electric drive according to claim 1, in which the number of the first conductor sections is equal to or different from the number of the second conductor sections.

7. The electric drive according to claim 1, in which the first short-circuiting means and the second short-circuiting means each form an electric star point.

8. The electric drive according to claim 1, in which the first short-circuiting means and the second short-circuiting means each have an electrical terminal for external contacting.

9. The electric drive according to claim 1, in which the first conductor sections and the second conductor sections each comprise at least one electrically conductive rod, the rods being arranged in slots of the stator.

10. The electric drive according to claim 1, in which the stator is designed to generate at least one rotating field in which the number of pole pairs is variable and/or the stator is designed to generate a plurality of rotating fields in which the number of pole pairs is not variable.

11. The electric drive according to claim 1, in which the first conductor sections are connected to a first power supply unit, and the second conductor sections are connected to a second power supply unit.

12. A supply system for the electric drive according to claim 1, the supply system comprising:
the electric drive;
a transformer connected to a power source;
a detachable electrical connection between the transformer and the first short-circuiting means;

a detachable electrical connection between the transformer and the second short-circuiting means; and
a battery,
wherein the electric drive is arranged between the transformer and the battery.

13. A method of operating the electric drive according to claim 1, comprising:
supplying an AC voltage by a power source;
rectifying the AC voltage by the electric drive; and
supplying a battery with a DC voltage provided by the electric drive.

14. A method of operating the electric drive according to claim 1, comprising:
supplying a DC voltage by a battery;
converting the DC voltage to an AC voltage by the electric drive; and
supplying the AC voltage provided by the electric drive to an electric load.

* * * * *